Patented Aug. 18, 1936

2,051,410

UNITED STATES PATENT OFFICE 2,051,410

PROCESS OF MAKING A DISPERSION OF A HARD RESIN OF THE COUMARONE INDENE TYPE

John A. Kenney, Plainfield, N. J., assignor to The Barrett Company, New York, N. Y., a corporation of New Jersey No Drawing. Application January 20, 1934, Serial No. 707,528

2 Claims. (Cl. 134—26)

My invention relates to dispersed systems of resinous materials and particularly to dispersions, such as emulsions or suspensions of resins of the coumarone-indene type.

Dispersions of saponifiable resins, such as rosin, have been used heretofore in the form of rosin size or rosin soaps, for the sizing of paper and in the formation of paper board and similar products. Resins, such as paracoumarone, para-indene and similar resins, derived from coal tar distillates are cheap and form excellent sizing materials and binding agents but such resins are not saponifiable. When it is desired to use resins of the coumarone-indene type for the sizing of paper, waterproofing materials, and for similar purposes, the resins have heretofore been dissolved in an organic solvent which is subsequently volatilized. The latter process is objectionable for the reason that the solvents employed for dissolving resins of the coumarone-indene type are expensive and many are inflammable. Their use usually requires the installation of relatively costly solvent-recovery apparatus.

I have discovered that unsaponifiable resins, and particularly resins of the coumarone-indene type, can be dispersed or emulsified directly to produce a dispersion or emulsion satisfactory for use in a variety of ways, and that such dispersions can be produced without employing large amounts of expensive and inflammable solvents for the resins.

Products obtained by the practice of my invention can be added to paper pulp or fiber stock in a beater as sizing or binding agents for the fibers, or the dispersions may be used in treating or impregnating fiber board, leather and similar material and for numerous other purposes. The dispersions of my invention can be used in the treatment of paper or in forming fibrous products to produce articles that have increased resistance to the action of water and alkali and to produce sheets of material that are either flexible or rigid as desired.

Among the objects of my invention are to overcome difficulties and objections heretofore presented to the use of unsaponifiable resins in the manufacture and treatment of paper, fiber, textiles and the like, and for various other purposes; to produce dispersions of unsaponifiable resins, such as resins of the coumarone-indene type, and to provide simple and economical methods for producing such dispersions.

These and other objects and features of my invention will appear from the following description thereof, in which reference is made to typical formulae and methods of procedure for producing dispersions of resins.

In accordance with my invention, dispersions of resins of the coumarone-indene type may be produced by grinding, comminuting or pulverizing the resin and distributing the same throughout an aqueous solution of a dispersing agent. The resin may be ground and then whipped in admixture with the aqueous solution by any suitable mechanism in various proportions. When a saponifiable material is employed in producing the dispersion, it may be added to either the dispersing agent or to the resin before mixing the materials, or the saponifiable material may be added to the resin and dispersing agent during the agitation thereof.

The method of producing dispersions of resins as herein set forth is particularly adapted to the treatment of resins of the coumarone-indene type that have relatively high melting points, that is, melting points above about 80° C., and especially those resins of the coumarone-indene type known as "varnish grade" resins which have melting points in the neighborhood of 110° C. and up to 150° C. or higher.

As an example of a preferred method of producing dispersions in accordance with my invention, resin of the coumarone-indene type, having a melting point of about 127° C. to 142° C. is placed in a pebble mill and ground until the resin is thoroughly comminuted. This may take about one hour. Instead of grinding the resin in a pebble mill, any other suitable device may be employed. The resin when comminuted and before dispersion thereof is preferably of such fineness that about 90 per cent of the resin will pass through a 200 mesh screen. 5 parts by weight of silicate of soda solution and 4 parts of rosin oil are added to 100 parts by weight of water and the material stirred together. The mixture of these materials is then added to 50 parts by weight of the pulverized resin in a pebble mill and the materials ground together until a stable suspension of the resin is produced. The grinding may take about seven hours, more or less.

The silicate of soda employed in the above example preferably contains a high ratio of $SiO_2$ to $Na_2O$; that is, a ratio of about three parts or more by weight of $SiO_2$ to one part of $Na_2O$. A typical silicate solution, such as I prefer to use, may have a density of about 42.5° Baumé and may contain 39.6 per cent by weight of sodium silicate having about 3.25 parts of $SiO_2$ to one part of $Na_2O$. I have also used silicate solutions having a density of 33.5° Baumé and containing 31.1 per cent by weight of sodium silicate having about 3.86 parts of SiO₂ to one part of Na₂O. I may, however, use other forms, grades and solutions of soluble silicates for producing the dispersions but prefer to employ solutions containing 30 per cent or more of silicate of soda.

While I have referred in the above example to the use of silicate of soda as the dispersing agent for the resin, I may employ other suitable agents such as sodium carbonate, caustic soda, ammonium hydroxide or trisodiumphosphate, as well as clays, such as bentonite, kaolin, or china clay. I may also use various saponifiable materials other than rosin oil to stabilize the dispersions. Suitable saponifiable materials that I have employed for this purpose include rosin, rosin soap, rosin size, linseed oil, linseed oil fatty acids, abietic acid, oleic acid, and other aliphatic acids and saponifiable materials.

The product obtained in the foregoing example is a stable dispersion which may be diluted with water to obtain a dispersion of the desired consistency. The proportions of the ingredients employed in producing the dispersion may be varied considerably, depending upon the character of the dispersions desired, the use to which the dispersions are to be put and the properties of the ingredients employed. For example, I have produced dispersions by using the formula of the example cited above but instead of using 100 parts by weight of water, I have increased and decreased the amount of water employed in the grinding operation to produce dispersions containing an amount of resin equal to from 5 to 70 per cent by weight of the amount of the water in the dispersion produced. However, I find that when using the proportions of the ingredients set forth, a smooth uniform dispersion of excellent body or consistency may be obtained in a pebble mill. The amount of silicate of soda solution employed in producing the preferred form of dispersion is equal to about 10 per cent of the weight of the resin. However, these proportions may be varied depending upon the properties of the silicate of soda in the solution and the concentration thereof. I have also produced very satisfactory products when using an amount of the silicate solutions described above equal to 20 per cent or more of the weight of the resin and as little as 5 per cent of the weight of the resin, or in other words, an amount of silicate of soda varying from about 1 per cent to about 5 per cent or more by weight of the total water in the dispersions and preferably about 2 per cent by weight of the total water. When using dispersing agents other than silicate of soda and when clay or similar materials are added to the dispersion, I may use a much wider range of proportions of the dispersing agents.

Although I suggest the use of a pebble mill in producing the dispersions, I may use other suitable agitating apparatus for effecting the dispersion of the resins. I may also vary the procedure by adding the pulverized resin to the liquid ingredients in the ball mill or mixer or I may add all of the ingredients to the mill at one time, the resin being in either pulverized or lump form. In the latter case, the grinding operation is prolonged, and therefore, I prefer to pulverize the resin prior to the dispersing operation.

In using dispersions such as that described above in the production of fiber board, wall board and laminated products and in the sizing of paper, I may employ a dispersion of any suitable consistency or resin content in such proportions that the amount of resin introduced into the product varies from about 5 per cent of the dry weight of the fiber up to about 30 per cent or more of the weight thereof. When used for such purposes, the dispersion is preferably introduced into a beater containing a pulp of the fiber to be treated. This pulp may contain paper stock, felt forming fibers, or other material, as desired. The resin dispersion and fiber are then thoroughly mixed together and the resin precipitated onto the fibers by the addition to the pulp of alum or other suitable flocculating agent or precipitant. After adding the alum, the mixture is again thoroughly agitated and formed into sheets of the desired thickness. Water is then removed from the sheets of material thus formed and the sheets dried. They may be subjected to heat to soften or fuse the resin particles, and to pressure, or otherwise treated to produce a product having the desired properties.

The characteristics of the resulting product will depend largely upon the ratio of resin to fiber remaining in the final product and upon the melting point and characteristics of the resin used. Ordinarily in sizing paper, the amount of resin is relatively small with respect to the weight of the dry fiber. Whereas in producing fiber board, wall board, and laminated products, the amount of resin may be much higher and preferably is in the neighborhood of 30 per cent or more by weight of the dry fiber determined by extraction of the resin from the fiber by means of a solvent for the resin.

In processes wherein the dispersions are used for forming sheets of material, the water removed from the sheets is sometimes found to contain a substantial amount of the resin of the dispersion. In order to avoid or diminish this loss, I may add to the dispersion a material which serves to increase the retention of the resin on the fibers. Among the materials which serve this purpose, I prefer to employ clays such as bentonite, kaolin or china clay. Dispersions of this type may be produced by suspending clay in the water used in producing the dispersion prior to the suspension of the resin therein.

In producing dispersions containing clay, I may use a formula such as the following:

|  | Parts by weight |
|---|---|
| Resin | 700 |
| Water | 1400 |
| Bentonite clay | 100 |
| Silicate of soda solution | 70 |
| Rosin | 60 |

The bentonite clay and the silicate of soda are added to the water, the clay being suspended therein. The resin in finely divided form and the rosin are then added and agitated or ground together in a pebble mill or other suitable apparatus.

The product obtained has a good body and is easily workable. When added to a pulp of fibers in a beater and formed into sheets, the retention of resin on the fibers of the material is improved, 80 per cent or more of the resin in the dispersion added to the fiber pulp remaining in the final product.

The invention herein may be employed to form stable emulsions or dispersion of other substantially non-saponifiable hard resinous materials. For example, hard resins made from cracked petroleum, as well known in the petroleum art, "Glyptal" resins, "Bakelite", pitch resins, and the substantially non-saponifiable ester gum may be emulsified in the manner hereinabove described for the emulsification of hard resins of the coumarone-indene type. Resins made by the polymerization of cracked distillates obtained from petroleum and/or natural gas have properties similar to the properties of paracoumarone resins and for many purposes may be used interchangeably with paracoumarone resins. The term "paracoumarone resin-like material" as used in the claims herein is intended to be a generic term to include both paracoumarone resin and resin obtained by the polymerization of such cracked distillates.

The methods of procedure and the formulae recited in the application have been given by way of illustration but it will be understood by those skilled in the art that the invention is capable of various changes and modifications in the proportions of the ingredients and in the operations employed in producing dispersions of the resins without departing from my invention.

I claim:

1. The method of producing a dispersion of hard resin of the coumarone indene type having a melting point of from about 127° to 142° C., in an aqueous medium containing alkali silicate as a dispersing agent, which comprises the steps of grinding the resin until it is thoroughly comminuted so that about 90% of the resin will pass through a 200 mesh screen, adding the comminuted resin to a solution of alkali silicate and continuing the grinding until a substantially stable dispersion results.

2. The method of producing a dispersion of hard resin of the coumarone indene type in an aqueous medium containing alkali silicate as a dispersing agent, which comprises the steps of grinding the resin until it is thoroughly comminuted so that the major portion of the resin will pass through a 200 mesh screen, adding the comminuted resin to a solution of alkali silicate and continuing the grinding until a substantially stable emulsion results.

JOHN A. KENNEY.